(12) United States Patent
McGrath

(10) Patent No.: US 8,713,529 B2
(45) Date of Patent: Apr. 29, 2014

(54) REPLACING MEMORY POINTERS WITH IMPLICIT POINTERS TO BE USED IN COMPILER-GENERATED DEBUG OUTPUT

(75) Inventor: Roland McGrath, Berkeley, CA (US)

(73) Assignee: Red Hat, Inc., Raleigh, NC (US)

( * ) Notice: Subject to any disclaimer, the term of this patent is extended or adjusted under 35 U.S.C. 154(b) by 830 days.

(21) Appl. No.: 12/847,367

(22) Filed: Jul. 30, 2010

(65) Prior Publication Data

US 2012/0030660 A1  Feb. 2, 2012

(51) Int. Cl.
*G06F 9/44* (2006.01)
*G06F 9/45* (2006.01)

(52) U.S. Cl.
USPC .................. 717/124; 717/125; 717/151

(58) Field of Classification Search
None
See application file for complete search history.

(56) References Cited

U.S. PATENT DOCUMENTS

| | | | | |
|---|---|---|---|---|
| 5,361,351 A * | 11/1994 | Lenkov et al. | ........... | 717/124 |
| 6,434,741 B1 * | 8/2002 | Mirani et al. | ........... | 717/124 |
| 6,976,250 B2 * | 12/2005 | Takayama et al. | ........... | 717/151 |
| 7,150,006 B2 * | 12/2006 | Bliss et al. | ........... | 717/124 |
| 7,765,525 B1 * | 7/2010 | Davidson et al. | ........... | 717/124 |
| 7,814,467 B2 * | 10/2010 | Li et al. | ........... | 717/151 |
| 8,468,500 B2 * | 6/2013 | Hatabu | ........... | 717/125 |
| 8,589,888 B2 * | 11/2013 | Cui et al. | ........... | 717/125 |
| 2005/0160058 A1 * | 7/2005 | Li et al. | ........... | 707/1 |
| 2010/0175056 A1 * | 7/2010 | Ogawa et al. | ........... | 717/151 |
| 2011/0296385 A1 * | 12/2011 | Wielaard | ........... | 717/124 |
| 2012/0030652 A1 * | 2/2012 | Jelinek | ........... | 717/124 |
| 2013/0019227 A1 * | 1/2013 | Chiu | ........... | 717/125 |

OTHER PUBLICATIONS

Microsoft, Microsoft Computer Dictionary, 2002, Microsoft Press, Fifth Edition, p. 410 (3 pages total).*
Dave Marshall, Advanced Pointer Topics, [Online] Jan. 1, 1999 [retrieved on Mar. 3, 2013], [Retrieved from the Internet] <http://www.cs.cf.ac.uk/Dave/C/node12.html> (5 pages total).*
Max Copperman, Debugging optimized code without being misled., [Online] May 1994, ACM Trans. Program. Lang. Syst. vol. 16 No. 3, [Retrieved from the Internet] <http://doi.acm.org/10.1145/177492.177517> pp. 387-427.*
D. S. Coutant; S. Meloy; and M. Ruscetta, DOC: A Practical Approach to Source-Level Debugging of Globally Optimized Code, [Online] Jun. 1988, SIGPLAN, [Retrieved from the Internet] <http://doi.acm.org/10.1145/960116.54003> pp. 125-134.*
Gary Brooks; Gilbert J. Hansen; and Steve Simmons, 1992. A New Approach to Debugging Optimized Code, [Online] Jul. 1992, SIGPLAN, [Retrieved from the Internet] <http://doi.acm.org/10.1145/143103.143108> pp. 1-11.*

(Continued)

*Primary Examiner* — Thuy Dao
*Assistant Examiner* — Ravi K Sinha
(74) *Attorney, Agent, or Firm* — Lowenstein Sandler LLP

(57) ABSTRACT

A mechanism for replacing memory pointers with implicit pointers is disclosed. A method of embodiments of the invention includes determining a memory pointer in a source code compiling on a computer system. The memory pointer is associated with a first value in the source code and serves as a referencing link to a second value in memory. The method further includes replacing the memory pointer with an implicit pointer as the memory pointer is optimized away during code optimization of the source code such that the implicit pointer is provided in a compiler-generated debug output to serve as an implicit reference link between the first value and second value. The implicit reference link was once provided as an explicit reference link by the memory pointer before getting optimized away.

15 Claims, 5 Drawing Sheets

(56) References Cited

OTHER PUBLICATIONS

Arnaldo Carvalho de Melo, The 7 dwarves: debuggin information beyond gdb, [Online] 2007, Linux Symposium vol. 2, [Retrieved from the Internet] <http://citeseerx.ist.psu.edu/viewdoc/download?doi=10.1.1.111.798&rep=rep1&type=pdf#page=35> pp. 35-44.*

* cited by examiner

REPLACING MEMORY POINTERS WITH IMPLICIT POINTERS TO BE USED IN COMPILER-GENERATED DEBUG OUTPUT

TECHNICAL FIELD

The embodiments of the invention relate generally to compiler optimization and, more specifically, relate to a mechanism for replacing memory pointers with implicit pointers to be used in compiler-generated debug output.

BACKGROUND

Pointers are well-known in software programming. A pointer refers to a programming language data type whose value refers or points to another value elsewhere in computer memory using its location or address. These pointers are assigned at the source code level and are particularly useful for repetitive operations since it is much more efficient, in terms of time and space, to copy and dereference a pointer than it is to copy and access the value that is referenced by the pointer. However, these pointers get "optimized away" during source code optimization "code optimization"), leaving the debugger unable to find referenced values in compiler-generated debug output and forcing the user (e.g., software developer, programmer) to perform the inefficient and cumbersome task of manually finding the referenced values, rely on un-optimized code, or even worse, give up.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for replacing memory pointers with implicit pointers. A method of embodiments of the invention includes identifying a memory pointer in a source code being compiled on a computer system. The memory pointer is associated with a first value in the source code and serves as a referencing link to a second value in memory. The method further includes replacing the memory pointer with an implicit pointer as the memory pointer is optimized away during code optimization of the source code such that the implicit pointer is provided in a compiler-generated debug output to serve as an implicit reference link between the first value and second value. The implicit reference link was once provided as an explicit reference link by the memory pointer before getting optimized away.

The embodiments of the invention are used to improve software compilation and debugging by providing implicit pointers for memory pointers that are optimized away during source code or program optimization ("code optimization"). The implicit pointers are used to maintain the pointers' reference information and serve as implicit reference links after the memory pointers are optimized away during code optimization. Further, during debugging, this reference information is obtained by dereferencing the implicit pointers. This way, the reference information that would have otherwise been lost during source code optimization along with the removal of memory pointers is maintained through implicit pointers and made available to users for debugging purposes as part of the debug output.

Figure 1:
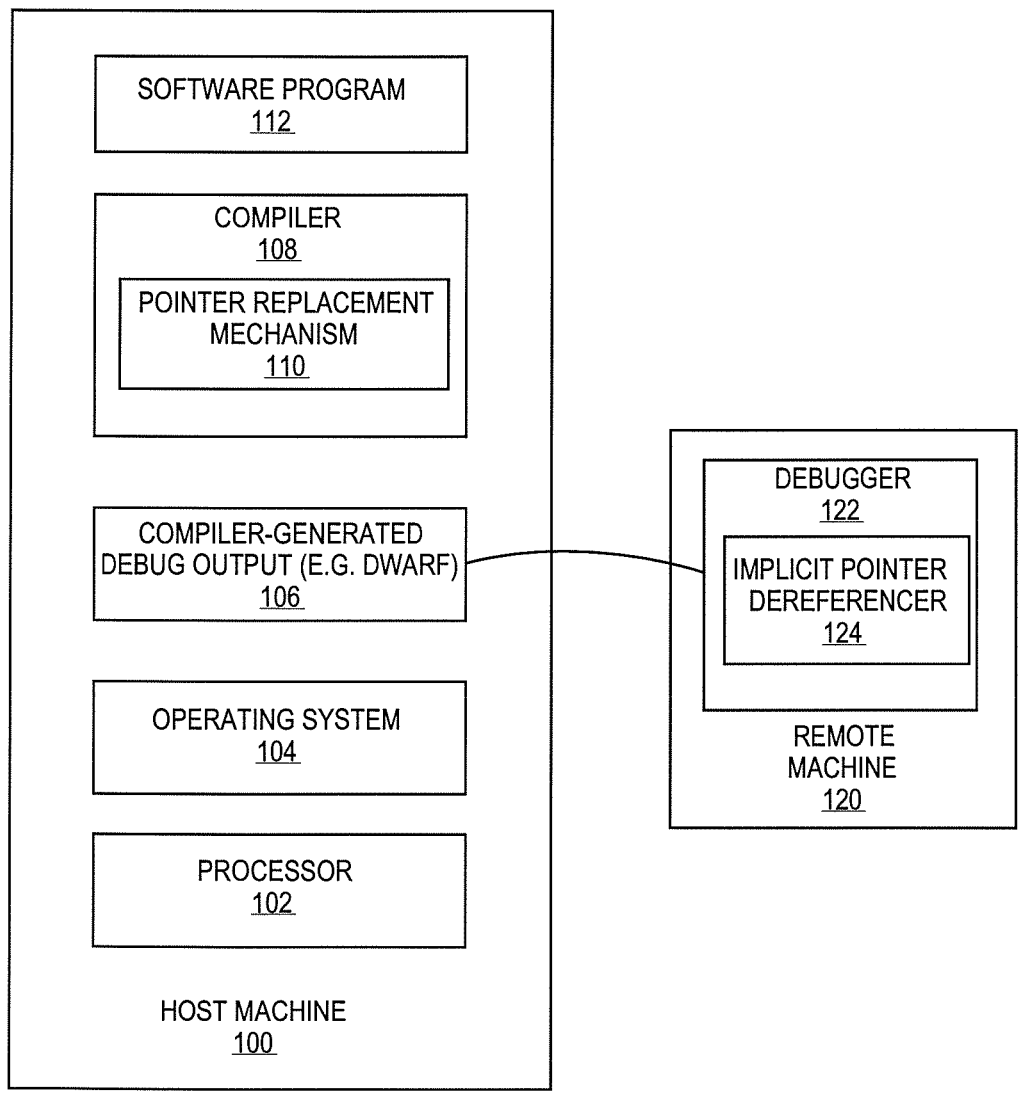
FIG. 1 illustrates a host machine employing a pointer replacement mechanism to replace memory pointers with implicit pointers.

FIG. 1 illustrates a host machine 100 employing a pointer replacement mechanism 110 to replace memory pointers with implicit pointers. In one embodiment, implicit pointers are allocated to a software code during its compilation to replace memory pointers that are optimized away during code optimization. Typically, at the source code level, a number of memory pointers are associated with the software code such that each pointer's associated value ("pointer value") refers or points to another value ("referenced value"), e.g., a variable containing a hexadecimal number, located somewhere in computer memory (e.g., in a register) using its corresponding location or address (e.g., register address).

Host machine 100 includes a base hardware platform having a processor 102 that is capable, for example, of working with a standard operating system 104. Operating system 104 serves as an interface between hardware/physical resources of the host machine 100 and the user. In some embodiments, base hardware platform may include memory devices, network devices, drivers, and so on.

Host machine 100 hosts a compiler 108 for compilation of source codes into machine codes, such as transforming the source code of software program 112 from a high-level programming language or source language (e.g., C, C++, etc.) to a lower level language or object code (e.g., machine code, assembly language, etc.) such that the software program 112 can become an executable program. Compiler 108 includes a software tool for transforming the software program 112 written with a high-level programming language into a low level machine code understandable by a computer system. Compilation includes generating the low level machine code and annotations which are then stored at a storage device as compiler-generated debug output ("debug output") 106. One example of such compiler-generated debug output 106 is DWARF debug output whose output format is referred to as DWARF debug format that employs Debugging Information Entries ("DIE"). The DWARF format is referenced in this document merely as an example for brevity, clarity and ease of understanding and it is contemplated that the embodiments of the invention are not limited to the DWARF format or any other particular debug output format.

Code optimization is aimed at making the result of such transformation as efficient as possible by, for example, minimizing or maximizing various attributes of the executable program. Code optimization refers to a process of modifying the software program 112 so that it executes more rapidly while consuming less storage, power, and other resources. As aforementioned, during code optimization, memory pointers assigned at the source code level are optimized away breaking the clear link between their pointer values and the corresponding referenced values.

In one embodiment, the compiler 108 includes pointer replacement mechanism 110 to replace memory pointers with implicit pointers such that the implicit pointers are used to inherit, maintain and provide the pointer value-referenced information ("reference information") that the memory pointers carried prior to being optimized away. Any reference information inherited and maintained through implicit pointers is then provided in the debug output 106 for debugging purposes. In one embodiment, in the debug output 106, each implicit pointer is represented as an annotation link between relevant annotations which, when dereferenced and followed, leads the debugger at a remote machine 122 to those referenced values that were once referenced by optimized-away initial pointers. It is contemplated that the annotation link (e.g., implicit pointer represented as an annotation link) is used here and throughout this document as an example for brevity, clarity and ease of understanding and that the implicit pointer may be represented in various different ways and remain independent of a particular programming language, operating system, debug output format, or the like. In one embodiment, implicit pointer dereferencer 124 at the debugger 122 possesses the ability to dereference (including detect, read, interpret, analyze, and follow) implicit pointers and their represented annotation links to reach location or addresses of the referenced values requested by users. Once the location of a reference value is known, the reference value is obtained and provided to the requesting user by displaying the referenced value on a display device in communication with, for example, the remote machine 120.

The debugger 122 refers to a debugging software application that accesses and uses the debug output 106 to perform debugging of the software program 112. The process of debugging is used for finding and reducing any errors, defects, and bugs in the software program 112 by loading the stored debug output 106 (including machine code and annotations produced during compilation) and running the machine code to examine the annotations in concert with running the machine code. In the illustrated embodiment, the remote machine 120 employs the debugger 122 having the implicit pointer dereferencer 124. In one embodiment, either one the two machines 100, 120 includes both the compiler having the pointer replacement mechanism 110 and the debugger 122 having the implicit pointer dereferencer 124. It is also contemplated that the debug output 106 may be stored at any of the host machine 100, the remote machine 120, and another storage medium. Further, each of the two machines 100, 120 may include a server computer system or a client computer system.

Embodiments of the present invention may be applied to the layers of compilation below the literal source code. Although the term "pointer" is used throughout this document as an example and for brevity, clarity, and ease of understanding, it is contemplated that there are different source code constructs (not just "pointers") in different programming languages where some are called "pointers" and some not. For example, C++ includes both "pointers" and "references" that have that have different nuances at the source code level, but both mean "pointers" in the mind of the compiler and are compiled, optimized, and executed the same way. In other cases, the compiler may translate some completely different source language constructs into "pointers", even when the idea or concept of "pointer" is absent from the source code. However, even in such cases, the code optimization does not store a memory address somewhere and then dereference it to access some value. In any of the cases mentioned above, in one embodiment, the optimized version of the source code replaces the actual memory pointer with an implicit pointer.

Figure 2:
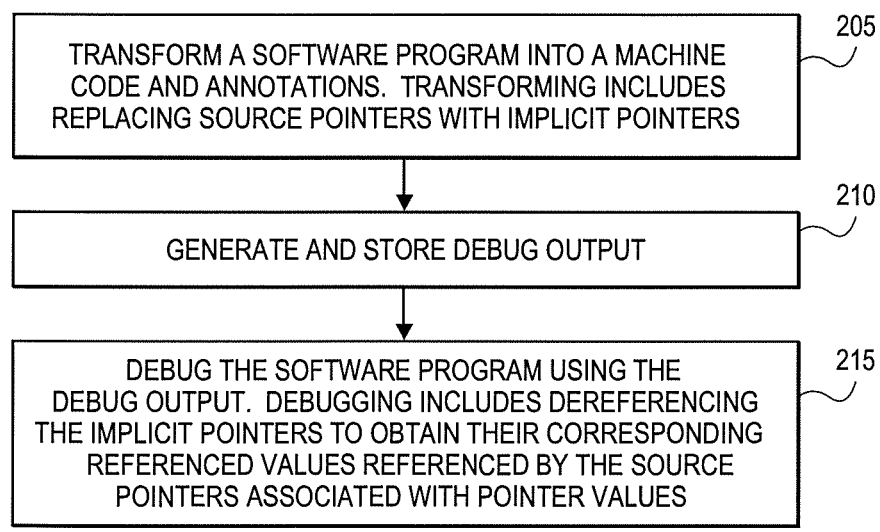
FIG. 2 illustrates a method for transforming a source code according to one embodiment of the invention.

FIG. 2 illustrates a method for transforming a source code according to one embodiment of the invention. Method 200 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 200 is performed by pointer replacement mechanism and/or implicit pointer dereferencer of FIG. 1.

Method 200 begins at block 205 where a software program is transformed or compiled into a machine code and annotations. This compilation further includes code optimization during which initial pointers are optimized away. In one embodiment, the memory pointers are replaced with implicit pointers as the memory pointers are optimized away during the code optimization process of the transformation or compilation of the software program. In one embodiment, during the optimization process, upon detecting that a memory pointer is being (or has been) optimized away, the memory pointer is replaced by an implicit pointer. The replacement is performed such that the reference link provided by memory pointers, now optimized away, is successfully transferred to the debug output 106 through implicit pointers and represented, in the debug output 106, as an annotation link. In one embodiment, in the debug output 106, the annotation link provides an implicit link between a first annotation (which may have been assigned during compilation) that is associated with a corresponding pointer value and a second annotation (which also may have been assigned during compilation) that leads (directly or indirectly) to the actual location or address from where the reference value can be extracted. In other words, without an implicit pointer representing an annotation link between the first annotation and the second annotation, the link between the two values would not exist and thus, the link or pointer reference information carried by a memory pointer would be lost as the memory pointer gets optimized away. In another embodiment, implicit pointers are added in the debug output after the optimization process to replace the previously optimized away memory pointers.

At block 210, debug output is generated by the compiler and deposited in a storage medium. Subsequently, at block 215, debugging of the software program is performed by having a debugger access and use the stored debug output. In one embodiment, in response to a request by a user for a referenced value being referred to by a pointer value (associated with a now optimized-away initial pointer), the debugger detects and dereferences an implicit pointer associated with the pointer value. Once the implicit pointer is detected and dereferenced, following the annotation link of the implicit pointer, the debugger obtains the referenced value and provides it to the user.

Figure 3A:
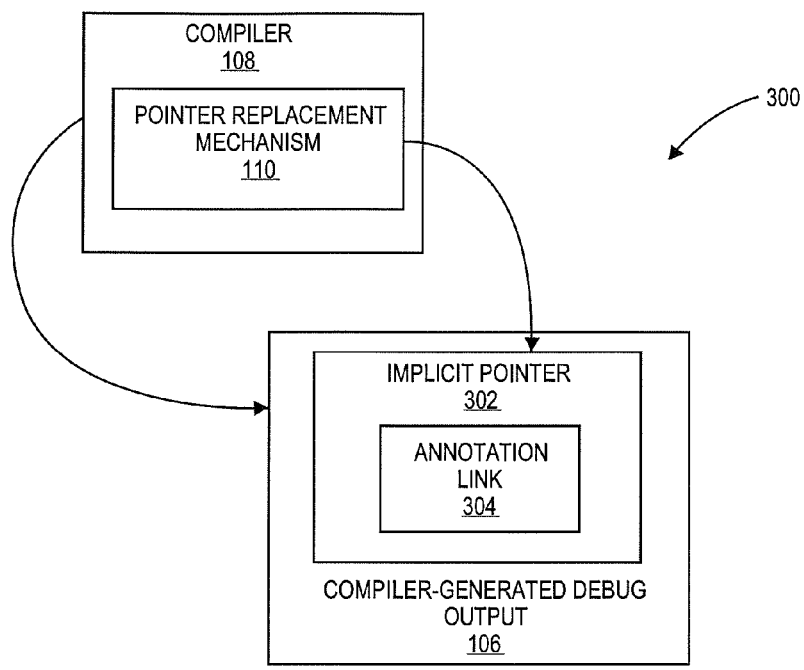
FIGS. 3A and 3B illustrate a system for pointer replacement and implicit pointer dereferencing according to one embodiment of the invention.
Figure 3B:
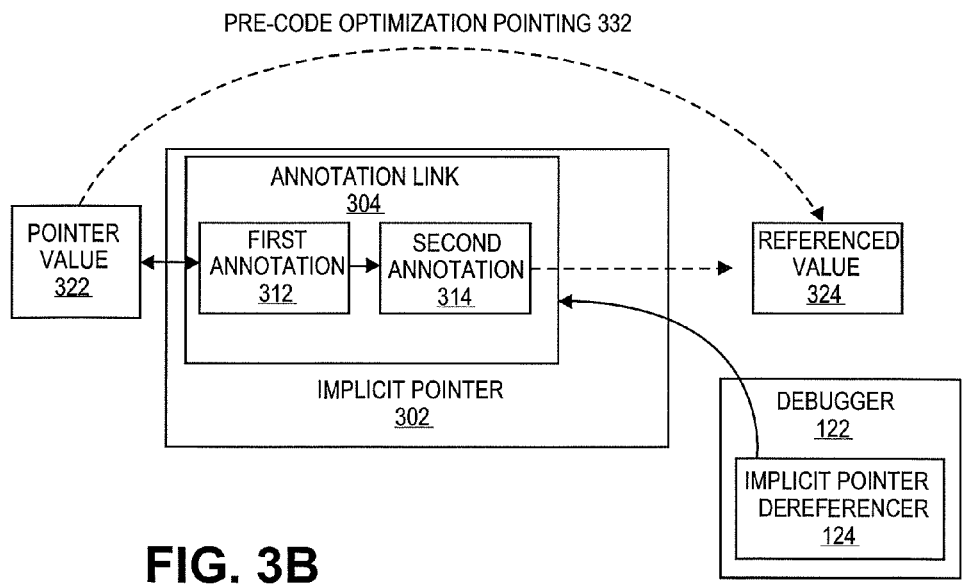

FIGS. 3A and 3B illustrate a system 300 for pointer replacement and implicit pointer dereferencing according to one embodiment of the invention. In the illustrated embodiment, compiler 108 generates debug output 106 which is stored at a storage device. In the illustrated embodiment, the compiler 108 includes a pointer replacement mechanism 110 to replace a memory pointer with an implicit pointer 302 such that the reference information carried by the memory pointers is inherited, maintained and provided through its replacement and corresponding implicit pointer 302. The implicit pointer 302, unlike the memory pointer, survives all the way through to the debug output 106 while carrying, using an annotation link 304, the reference information relating to a pointer value 322 associated with the replaced memory pointer and its referenced value 324 as shown by the dotted arrow representing their pre-code optimization pointing 332. In one embodiment, a memory pointer is replaced by an implicit pointer 302 during code optimization as it is detected that the memory pointer is being optimized away or, in another embodiment, the implicit pointer 302 is added to the debug output 106 after the corresponding memory pointer is optimized away.

Referring to FIG. 3B, in one embodiment, the replacement of the memory pointer with the implicit pointer 302 is performed by detecting and tracking annotations 312, 314 that are known by the compiler to link the pointer value 322 with the referenced value 324. In one embodiment, a first annotation 312 associated with the pointer value 322 is detected or identified and tracked using the available annotation identification and tracking techniques. Similarly, a second annotation 314 that provides a way (directly or indirectly) to the referenced value 324 is detected or identified and tracked. An annotation may be allocated during compilation of a source code and provided in the debug output 106 and may include or represent a variety of information, such as ranging from an annotation that includes a line number associated with a compiler statement to an annotation that provides information about a particular source code statement. In one embodiment, the first and second annotations 312, 314 are then linked with each other to generate an annotation link 304 that is represented in the debug output 106 by the implicit pointer 302. Since the annotation link 304 is provided as part of the debug output 106, the debugger, using an implicit pointer dereferencer 124, accesses and dereferences the implicit pointer 302. This implicit pointer dereferencing includes determining whether the pointer value 322 is represented by or associated with an implicit pointer annotation 312. Once the first annotation 312 is determined, its annotation link 304 to the second annotation 314 is followed by the implicit pointer dereferencer 124 until the referenced value 324 is reached. This implicit pointer dereferencing process is performed in response to a user request (e.g., print*a, wherein a represents the pointer value) for wanting to know the value (e.g., the referenced value 324) that is referred to by the pointer value 322. The referenced value 324 is provided to the user by displaying it on a display screen.

In case of the DWARF debugging format, the new implicit pointer 302 may be added as DW_OP_implicit_pointer with its annotation link 304 being represented as an operand. The debugging information entry reference may be used to specify an object that has the semantics of a target memory address but that neither has any actual location nor the value of any actual memory address; instead, it refers to an imaginary or virtual address inside another object. Further, the debugging information entry indicated by this operand may include either a location attribute (e.g., DW_AT_location) or a value attribute (e.g., DW_AT_const_value). The location attribute describes the location of a variable or parameter at runtime. The value attribute describes a variable or formal parameter whose value may be constant and not represented by an object in the address space of the software program, or an entry describing a named constant. The semantic operation of dereferencing an implicit pointer and analyzing of the debugging information entry reference leads to a referenced value or its location. In case there is no program entity with an entry to refer to, a DWARF tag entry (e.g., DW_TAG_dwarf_procedure) can be created to serve this purpose. As aforementioned, DWARF is merely one format of debug output that is mentioned here as an example and the embodiments of the invention are not limited to it.

Figure 4:
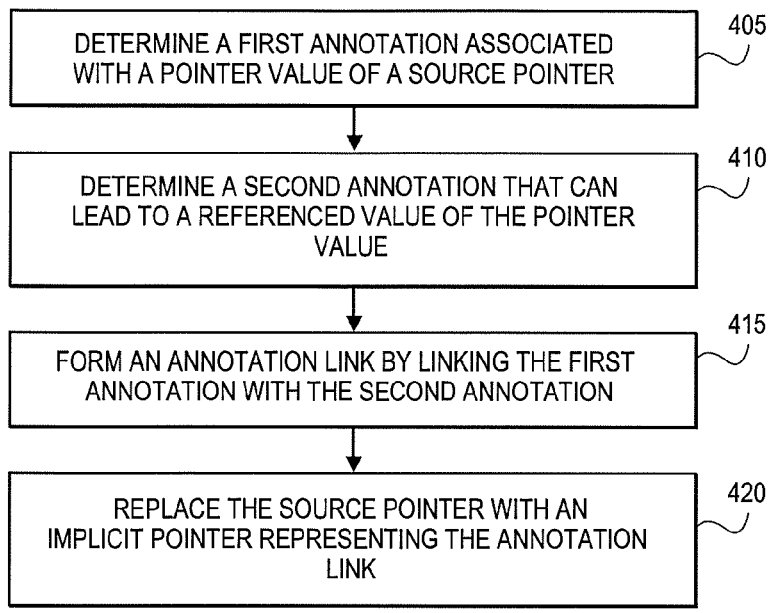
FIG. 4 illustrates a method for replacing memory pointers with implicit pointers according to one embodiment of the invention.

FIG. 4 illustrates a method for replacing memory pointers with implicit pointers according to one embodiment of the invention. Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by pointer replacement mechanism of FIG. 1.

Method 400 begins by identifying and tracking a first annotation associated with a pointer value of each memory pointer at block 405. At block 410, a second annotation that is capable of leading to a referenced value that is pointed to by the pointer value is identified and tracked. In one embodiment, the first and second annotations are identified and tracked using the available annotation identification and tracking techniques. The first annotation and the second annotation are then linked with each other to form an annotation link represented by an implicit pointer at block 415. At block 420, the memory pointer is then replaced by the implicit pointer as the memory pointer is optimized away such that the implicit pointer maintains the reference information associated with the pointer value and the referenced value and provides it in the compiler-generated debug output (while the original memory pointer is optimized away during code optimization). As aforementioned, in one embodiment, the implicit pointer replaces the memory pointer during code optimization as (it is detected that) the memory pointer is being optimized away or, in another embodiment, the implicit pointer replaces the source code in the debug output after the corresponding memory pointer is optimized away. Further, as mentioned above, annotations may be allocated during the compilation process and, using the available annotation identification and tracking techniques, these annotations identified and tracked such that they can be linked with their corresponding and relevant annotations to form annotations links that are then represented by implicit pointers.

Figure 5:
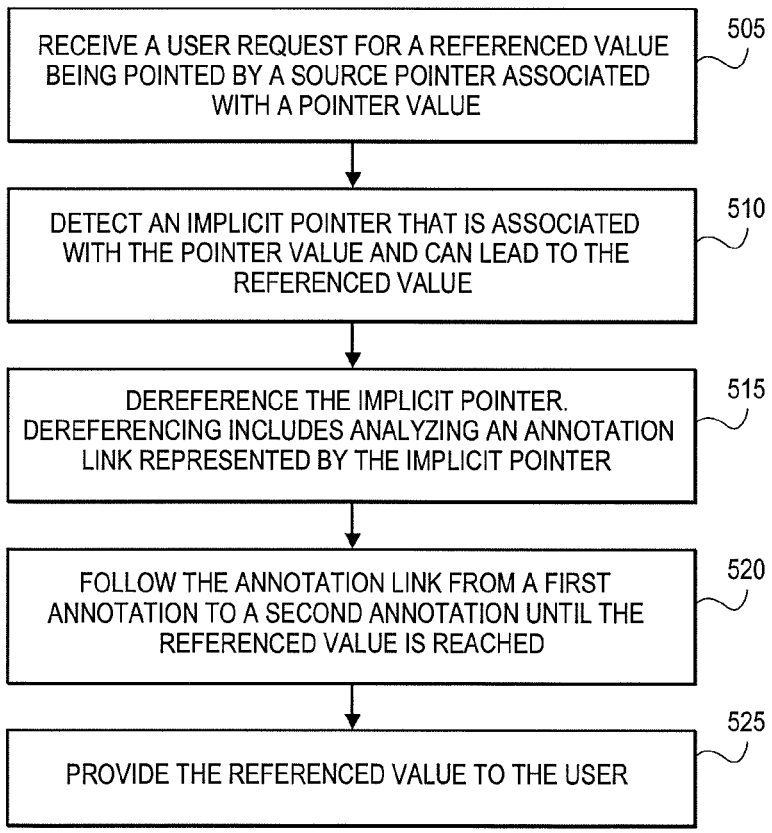
FIG. 5 illustrates a method for dereferencing implicit pointers according to one embodiment of the invention.

FIG. 5 illustrates a method for dereferencing implicit pointers according to one embodiment of the invention. Method 500 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by implicit pointer dereferencer of FIG. 1.

Method 500 begins with receiving a user request seeking a referenced value referred to by a pointer value through a memory pointer at block 505. In response to the request, the debugger, via its implicit pointer dereferencer, detects an implicit pointer associated with the pointer value by determining whether there is an implicit pointer annotation (e.g., first annotation) associated with the pointer value at block 510. At block 515, the implicit pointer is dereferenced. This implicit pointer dereferencing includes following the first annotation's link to a second annotation that leads to the referenced value. At block 520, the debugger continues with following the second annotation (and other annotations linked with it, if any) until the referenced value or its location or address is reached. The referenced value is obtained from its location and provided to the user at block 525.

Figure 6:
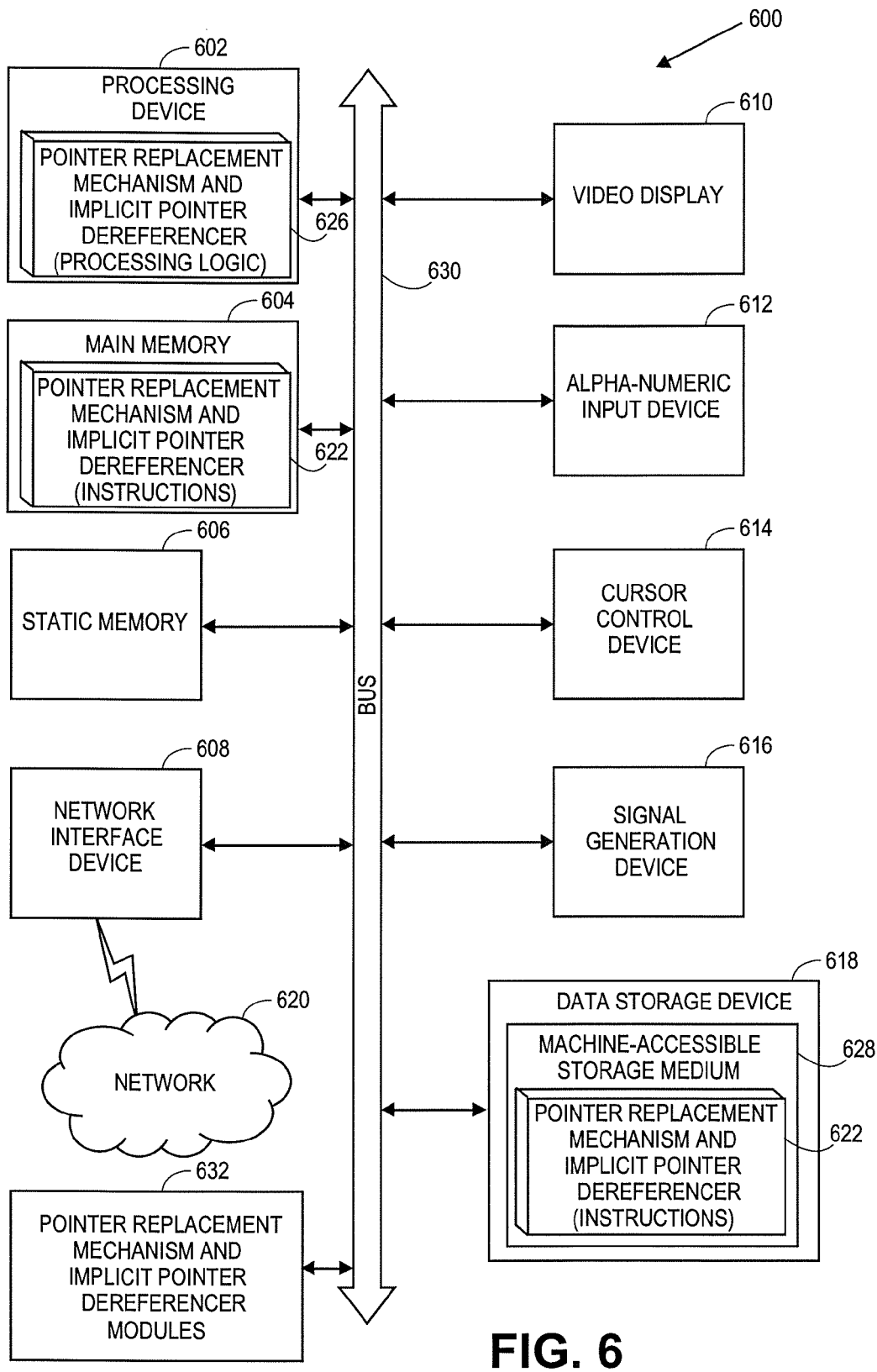
FIG. 6 illustrates one embodiment of a computer system.

FIG. 6 illustrates a computer system 600 for employing pointer replacement mechanism and implicit pointer dereferencer according to one embodiment of the invention. Within the computer system 600 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, random access memory (RAM), dynamic RAM (DRAM) such as synchronous DRAM (SDRAM), DRAM (RDRAM), etc.), a static memory 606 (e.g., flash memory, static random access memory (SRAM), etc.), and a secondary memory 618 (e.g., a data storage device in the form of a drive unit, which may include fixed or removable machine-accessible or computer-readable storage medium), which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic 626 for performing the operations and methods discussed herein.

The computer system 600 may further include a network interface device 608. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 616 (e.g., a speaker).

The data storage device 618 may include a machine-accessible storage medium (or a computer-readable storage medium) 628 on which is stored one or more sets of instructions 622 (e.g., pointer replacement mechanism and implicit pointer dereferencer) embodying any one or more of the methodologies or functions described herein. The pointer replacement mechanism and implicit pointer dereferencer may also reside, completely or at least partially, within the main memory 604 (e.g., pointer replacement mechanism and implicit pointer dereferencer (instructions) 622) and/or within the processing device 602 (e.g., pointer replacement mechanism and implicit pointer dereferencer (processing logic) 626) during execution thereof by the computer system 600, the main memory 604 and the processing device 602 also constituting machine-readable storage media. Further, for example, the pointer replacement mechanism and implicit pointer dereferencer instructions 622 may be transmitted or received over a network 620 via the network interface device 608. As aforementioned with reference to FIG. 1, in one embodiment, pointer replacement mechanism and implicit pointer dereferencer may be employed on the same computer system or on different computer systems, such as pointer replacement mechanism resides on one computer system while each of several other computer systems having an implicit pointer dereferencer.

The machine-readable storage medium 628 may also be used to store the pointer replacement mechanism and implicit pointer dereferencer (instructions) 622 persistently. While the machine-accessible storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Pointer replacement mechanism and implicit pointer dereferencer modules 632, components and other features described herein (for example in relation to FIG. 1) can be implemented as discrete hardware components or integrated in the functionality of hardware components such as ASICS, FPGAs, DSPs or similar devices. In addition, the modules 632 can be implemented as firmware or functional circuitry within hardware devices. Further, the modules 632 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "allocating", "establishing", "maintaining", "continuing", "translating", "transforming", "optimizing", "debugging", "determining", "detecting", "forming", "replacing", "receiving", "dereferencing", "following", "providing", displaying", "linking" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
   compiling, by a processing device, source code into optimized code;
   identifying, by a processing device during the compiling, a memory pointer in the source code, wherein the memory pointer corresponds to a first value in the source code and serves as a referencing link to a second value in memory;
   when the memory pointer is optimized away during the compiling of the source code, replacing the memory pointer with an implicit pointer that comprises an implicit reference link between the first value and second value, wherein the implicit reference link previously provided as an explicit reference link by the memory pointer in the source code before the compiling and comprising an annotation link that is maintained between a first annotation associated with the first value and a second annotation providing information leading to a location storing the second value; and
   generating, by the processing device, the compiled code and a compiler-generated debug output associated with the compiled code, the compiler-generated debug output comprising annotations in a debug format, the annotations comprising at least the implicit reference link.

2. The method of claim 1, wherein, at a debugger, in response to a request from a user, the implicit pointer is dereferenced to follow the first annotation to lead to the second annotation and further to the location storing the second value.

3. The method of claim 2, wherein the second annotation is further linked to one or more annotations leading to the location storing the second value.

4. The method of claim 2, further comprising obtaining the second value from the location.

5. The method of claim 4, further comprising providing the second value to the user by displaying the second value on a display device.

6. A system comprising:
   a memory;
   a processing device communicably coupled to the memory; and
   a compiler communicably coupled to the processing device, the compiler comprising a pointer replacement component to:
   compile source code into optimized code;
   identify, during the compiling, a memory pointer in the source code, wherein the memory pointer corresponds to a first value in the source code and serves as a referencing link to a second value in memory;
   when the memory pointer is optimized away during the compiling of the source code, replace the memory pointer with an implicit pointer that comprises an implicit reference link between the first value and second value, wherein the implicit reference link previously provided as an explicit reference link by the memory pointer in the source code before the compiling and comprising an annotation link that is maintained between a first annotation associated with the first value and a second annotation providing information leading to a location storing the second value; and
   generate the compiled code and a compiler-generated debug output associated with the compiled code, the compiler-generated debug output comprising annotations in a debug format, the annotations comprising at least the implicit reference link.

7. The system of claim 6, further comprising a debugger at a remote computer system coupled with the system, the debugger comprising an implicit pointer deferencer to, in response to a request from a user, dereference the implicit pointer to follow the first annotation to lead to the second annotation and further to the location storing the second value.

8. The system of claim 7, wherein the second annotation is further linked to one or more annotations leading to the location storing the second value.

9. The system of claim 7, wherein the second value is obtained from the location.

10. The system of claim 9, further comprising a display device communicably coupled to the memory and the processing device, the display device to display the second value.

11. A non-transitory machine-readable storage medium including instructions that, when accessed by a processing device, cause the processing device to perform operations comprising:
- compiling, by the processing device, source code into optimized code;
- identifying, by the processing device during the compiling, a memory pointer in the source code, wherein the memory pointer corresponds to a first value in the source code and serves as a referencing link to a second value in memory;
- when the memory pointer is optimized away during the compiling of the source code, replacing the memory pointer with an implicit pointer that comprises an implicit reference link between the first value and second value, wherein the implicit reference link previously provided as an explicit reference link by the memory pointer in the source code before the compiling and comprising an annotation link that is maintained between a first annotation associated with the first value and a second annotation providing information leading to a location storing the second value; and
- generating, by the processing device, the compiled code and a compiler-generated debug output associated with the compiled code, the compiler-generated debug output comprising annotations in a debug format, the annotations comprising at least the implicit reference link.

12. The non-transitory machine-readable storage medium of claim 11, wherein, at a debugger, in response to a request from a user, the implicit pointer is dereferenced to follow the first annotation to lead to the second annotation and further to the location storing the second value.

13. The non-transitory machine-readable storage medium of claim 12, wherein the second annotation is further linked to one or more annotations leading to the location storing the second value.

14. The non-transitory machine-readable storage medium of claim 12, wherein the second value is obtained from the location.

15. The non-transitory machine-readable storage medium of claim 14, wherein the operations further comprise providing the second value to the user by displaying the second value on a display device.

* * * * *